June 17, 1952     C. C. WILLSON     2,601,198
FISHING BAIT AERATING DEVICE
Filed Jan. 24, 1951
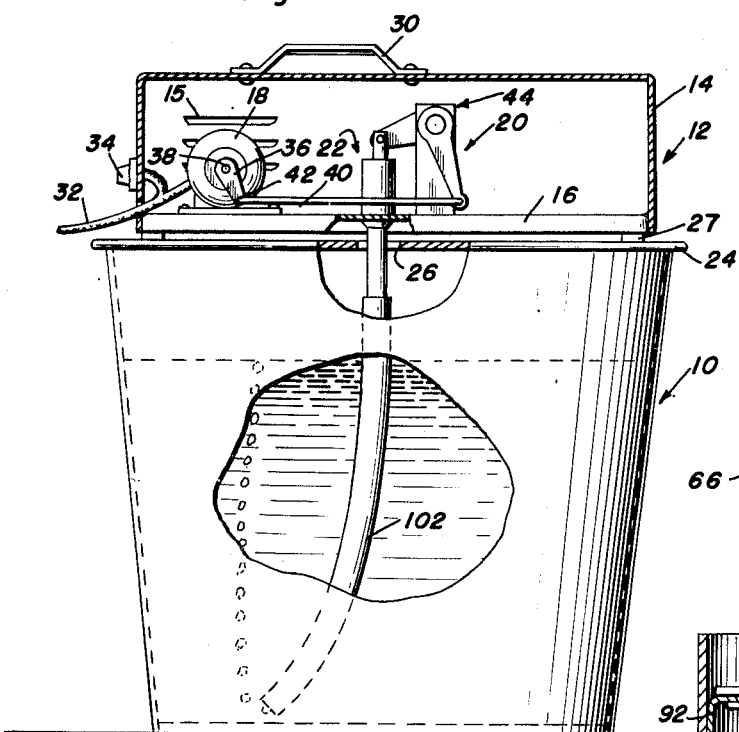
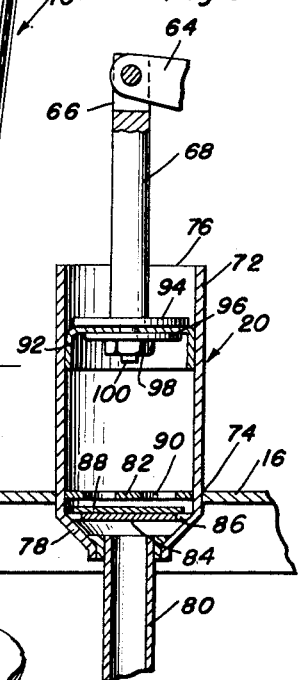
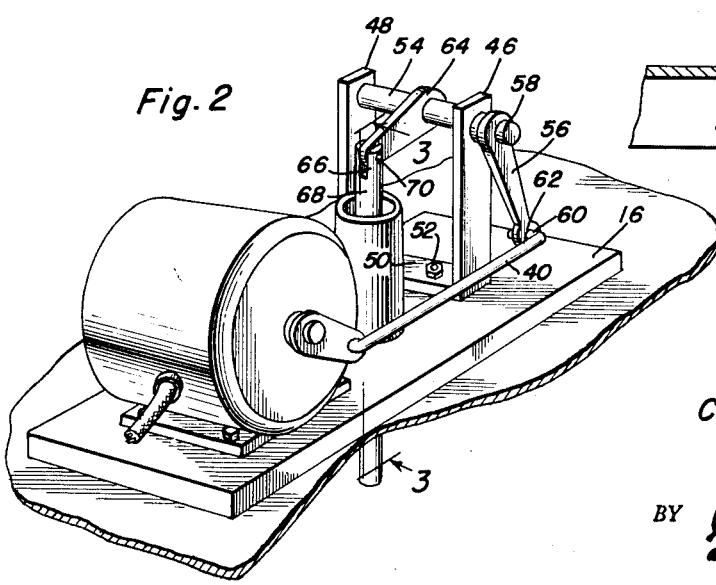
Carl C. Willson
INVENTOR.

Patented June 17, 1952

2,601,198

UNITED STATES PATENT OFFICE 2,601,198

FISHING BAIT AERATING DEVICE

Carl C. Willson, Oklahoma City, Okla.

Application January 24, 1951, Serial No. 207,610

3 Claims. (Cl. 43—57)

The present invention relates to improvements in aerating devices and more particularly to an aerating device which is in the form of an attachment for mounting on a conventional minnow bucket or the like whereby the live bait contained in the bucket will be maintained in a lively condition while being transported to a fishing site.

An object of the present invention is to provide an aerating attachment for minnow buckets or the like and wherein the attachment includes a prime mover actuatable by the electric power of an automobile storage battery and which prime mover is connected to a reciprocating plunger-type pump for effecting operation thereof whereby air may be pumped through the liquid contained in the bucket.

A still further object of the present invention resides in the novel arrangement of connecting elements between the prime mover and reciprocating plunger of the pump whereby the reciprocation of the plunger is effected.

Another object of the present invention resides in the novel construction of the pump means per se whereby the back flow through the pump housing is prevented during the suction stoke of the plunger.

Various other objects and advantages will become apparent from the detailed description to follow. The best form in which I have contemplated applying my invention is clearly illustrated in the accompanying drawings, wherein:

Figure 1 is a side elevational view of a conventional minnow bucket having the fishing bait aerating device of the present invention mounted thereon with parts in section;

Figure 2 is a detail perspective view of the fishing bait aerating device showing it mounted on a cover for a minnow bucket, the cover being shown in part; and Figure 3 is a vertical transverse sectional view taken substantially along the plane of line 3—3 of Figure 2.

Referring more particularly to the drawings, wherein like numerals designate like parts throughout, the numeral 10 designates generally a conventional minnow bucket with which the aerating device 12 of the present invention is adapted to be attached. The aerating device 12 is comprised of a housing 14, a base 16, prime mover 18, connecting means 20 and pump means 22.

The conventional minnow bucket 10 is provided with a cover 24 formed with an opening 26 at the central portion thereof for a purpose to be hereinafter described.

Disposable on the cover 24 is the supporting platform 16 of the housing 14, the platform 16 being provided with pads 27 or the like, and the housing 14 being fixedly secured to the platform 16 by means of weld or solder. The housing 14 is also formed with a handle 30 for carrying the attachment.

Disposed on the platform 16 is the prime mover 18 which is preferably a 6-volt electric motor which has a cable 32 for connection with the electric storage battery of the vehicle in which it is being transported. A variable control switch 34 is connected to the electric motor 18 for varying the rotational speed thereof.

A pitman arm 36 is fixedly secured to the shaft 38 of the electric motor 18 and has a connecting rod 40 pivotally secured to its outer end at 42. A standard 44 is mounted at an intermediate portion of the platform 16, and as best seen in Figure 2, the standard is comprised of a pair of upstanding elements 46 and 48 having a bight portion 50 joining their bottom ends and secured to the platform 16 by means of the bolts 52. A stub shaft 54 is rotatably supported in the upper ends of the elements 46 and 48 and a first lever 56 is fixedly secured to one end of the stub shaft 54 at 58. The first lever 56 is pivotally connected to the connecting rod 40 by means of the angulated end 60 extending through the opening 62 in the lower end of the first lever 56.

Also secured for rotation with the stub shaft 54 is a second lever 64 which is pivotally connected to the bifurcated upper end 66 of the plunger 68. A pin 70 extends through the bifurcated end 66 and second lever 64 for connecting the two elements.

The pump means 22 is best seen in Figure 3 as comprising a housing 72 welded in upstanding relation to the platform 16 at 74. The housing 72 has an open upper end 76 and a tapered lower end 78 terminating in a downwardly extending tubular outlet 80. An apertured disk 82 is fixedly secured to the inner wall of the housing 72 and partitions the housing 72 from the tapered portion 78. Reciprocably disposed within the tapered portion 78 is a flat circular plate 84 having peripheral grooves 86 formed therein. The plate 84 also is formed with a sealing disk 88 secured to its upper surface for engagement against the apertured disk 82. The sealing disk 88 is of an area substantially greater than that covered by the apertures or ports 90 of the apertured disk 82, whereby when the plunger 68 is in its uppermost position, the sealing disk 88 will be engaged against the apertured disk 82 for sealing the tubular outlet 80 from communication with the housing 72.

The plunger 68 has a flexible diaphragm or cup washer 92 secured to its lower end between the flange 94 and washer 96 by means of the nut 98 on the bolt 100.

The tubular outlet 80 is provided with a rubber hose 102 which extends downwardly into the minnow bucket 10 whereby the air passing through the tube 102 will bubble from the bottom of the bucket 10 through the liquid contained therein, thereby keeping the live bait in the bucket in a fresh condition.

It is believed that one skilled in the art will readily understand the operation of the present invention from a consideration of the foregoing. When the electric motor 18 is actuated the pitman arm 36 will be rotated and the first lever 56 will be pivoted. Thus the second lever 64, angularly disposed to the first lever 56 will be pivoted and will effect reciprocation of the plunger and diaphragm 68 and 92, respectively. On the upstroke of the plunger 68 the elements 84 and 88, functioning as a check valve, are seated by suction on the disk 82, closing and sealing the outlet ports 90, and air from the atmosphere is drawn into the pump chamber past the cup washer 92. Then, on the down stroke of the plunger, the elements 84 and 88 drop to open position as seen in Figure 3 of the drawings and the air trapped in the pump chamber is forced through the ports 90, the passages 86 and the tube 80 and discharged into the water in the lower portion of the bucket 10.

Having described the invention, what is claimed as new is:

1. A fishing bait aerating device including an attachment to be disposed on a conventional minnow bucket comprising a cover having an opening therein, said attachment comprising a platform with an opening therethrough communicable with the opening in the cover of said bucket, a prime mover fixedly secured on said platform and having a drive shaft, a pitman arm secured to said shaft and having a connecting rod pivotally secured to its outer end, a standard fixedly mounted on said platform, a stub shaft journaled on said standard, a first lever connecting said connecting rod to said stub shaft for effecting pivoting movement thereof in response to actuation of said prime mover, air pump means secured to said support and overlying the opening in the platform, and a second lever interconnecting said stub shaft to said pump means for effecting pumping of air through said openings.

2. A fishing bait aerating device including an attachment to be disposed on a conventional minnow bucket comprising a cover having an opening therein, said attachment comprising a platform with an opening therethrough communicable with the opening in the cover of said bucket, a prime mover fixedly secured on said platform and having a drive shaft, a pitman arm secured to said shaft and having a connecting rod pivotally secured to its outer end, a standard fixedly mounted on said platform, a stub shaft journaled on said standard, a first lever connecting said connecting rod to said stub shaft for effecting pivoting movement thereof in response to actuation of said prime mover, air pump means secured to said support and overlying the opening in the platform, a second lever interconnecting said stub shaft to said pump means for effecting pumping of air through said openings, said pump means including a cylindrical housing fixed in upstanding relation to said platform and having an open upper end and a lower tubular outlet, a tapered portion being formed intermediate the tubular outlet and said housing, a plunger having a flexible diaphragm reciprocably engaged within said housing and connected to said second lever for reciprocating movement, and check valve means in said tapered portion for preventing back flow through said housing.

3. A fishing bait aerating device including an attachment to be disposed on a conventional minnow bucket comprising a cover having an opening therein, said attachment comprising a platform with an opening therethrough communicable with the opening in the cover of said bucket, a prime mover fixedly secured on said platform and having a drive shaft, a pitman arm secured to said shaft and having a connecting rod pivotally secured to its outer end, a standard fixedly mounted on said platform, a stub shaft journaled on said standard, a first lever connecting said connecting rod to said stub shaft for effecting pivoting movement thereof in response to actuation of said prime mover, air pump means secured to said support and overlying the opening in the platform, a second lever interconnecting said stub shaft to said pump means for effecting pumping of air through said openings, said pump means including a cylindrical housing fixed in upstanding relation to said platform and having an open upper end and a lower tubular outlet, a tapered portion being formed intermediate the tubular outlet and said housing, a plunger having a flexible diaphragm reciprocably engaged within said housing and connected to said second lever for reciprocating movement, check valve means in said tapered portion for preventing back flow through said housing, said check valve means including an apertured disk partitioning the lower end of said housing and said tapered portion, a freely supported circular plate having peripheral notches formed therein, and a sealing disk secured to the upper face of said plate and being of an area overlying the apertures in said apertured disk whereby when the plunger is on a suction stroke, said sealing disk prevents back flow through the apertures.

CARL C. WILLSON.

REFERENCES CITED

The following references are of record in the file of this patent:

UNITED STATES PATENTS

| Number | Name | Date |
|---|---|---|
| 210,034 | Higgins | Nov. 19, 1878 |
| 1,117,729 | Ward | Nov. 17, 1914 |
| 2,454,343 | Rotter et al. | Nov. 23, 1948 |
| 2,460,527 | Oliveros | Feb. 1, 1949 |